US007050954B2

(12) United States Patent
Singh et al.

(10) Patent No.: US 7,050,954 B2
(45) Date of Patent: May 23, 2006

(54) TRACKING NOISE VIA DYNAMIC SYSTEMS WITH A CONTINUUM OF STATES

(75) Inventors: Rita Singh, Watertown, MA (US); Bhiksha Ramakrishnan, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 733 days.

(21) Appl. No.: 10/293,683

(22) Filed: Nov. 13, 2002

(65) Prior Publication Data

US 2004/0093194 A1 May 13, 2004

(51) Int. Cl.
*G06F 17/10* (2006.01)
*G06F 15/00* (2006.01)
*G06L 15/20* (2006.01)

(52) U.S. Cl. ........................... 703/2; 702/191; 704/233

(58) Field of Classification Search .................... 703/2; 702/191; 704/233
See application file for complete search history.

(56) References Cited

OTHER PUBLICATIONS

Raj et al., "Cepstral compensation by polynomial approximation for environment-independent speech recognition"; IEEE ICSLP '96; pp. 2340-2343; 1996.*

* cited by examiner

*Primary Examiner*—Hugh Jones
(74) *Attorney, Agent, or Firm*—Dirk Brinkman; Andrew J. Curtin

(57) ABSTRACT

A system and method reduces noise in a time series signal. A primary signal including stationary and non-stationary noise is modeled by a dynamic system having a continuum of states. A secondary signal including time series data is added to the primary signal to form a combined signal. The generic noise in the combined signal is estimated from samples of the combined signal using the dynamic system modeling the generic noise. Then, the estimated generic noise is removed from the combined signal to recover time series data.

19 Claims, 6 Drawing Sheets

200

100

1. Set $P(n_0|y_{0,-1}) = P(n_0)$. Set $t = 0$.
2. Generate $N$ samples of noise from $P(n_t|y_{0,t-1})$.
3. Compute $P(n_t|y_{0,t})$ using Equation (17).
4. Compute $P(n_{t+1}|y_{0,t})$ using Equation (18).
5. Set $t = t+1$ and return to step 2.

*Fig. 5*

TRACKING NOISE VIA DYNAMIC SYSTEMS WITH A CONTINUUM OF STATES

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates generally to signal processing, and more particularly, methods and systems for reducing noise in time series signals.

BACKGROUND OF THE INVENTION

In the prior art as shown in FIG. 1, a signal processing system 100 is generally modeled as follows. A dynamic system 110 generates a primary signal 111. The primary signal 111 as used herein is a dynamic time series, e.g. human speech.

The primary signal 111 is subject 120 to a corrupting and additive secondary signal 121, e.g., stationary random, white or Gaussian noise, to produce a combined signal 122. Because the noise "looks" the same at any instant in time, it can be considered "stationary." The problem is to substantially recover the primary 111 signal from the combined signal 122.

Therefore, in the prior art, the combined signal 122 is measured to obtain samples 130. An estimate 141 of the stationary noise is determined 140 based on an understanding or model of the dynamic system 110 that generated the primary signal 111, i.e., the speech signal. The estimated noise 141 is then removed 150 from the samples 130 to recover the primary signal 111 having a reduced level of noise.

The prior art model 100 assumes that the noise in the combined time series data 122 is the output of some underlying process. The nature or the parameters of that process may not be fully known, therefore, it is generally modeled as a random process.

Additional formulations represent what is known about the underlying primary signal. The dynamic systems 110 represent a convenient tool for such representations of the primary signal because dynamic systems can accommodate arbitrarily complex processes, diverse sources of information, and are amenable to standard analytical tools when simplified to suitable forms.

A conventional approach to estimating 140 the noise 141 affecting the combined signal 122 is to model the speech signal as an output 111 of the dynamic system 110, such as a hidden Markov model (HMM), and to estimate 140 the noise 141 based on variations of the measured signal 130 from typical output of the known underlying system 110.

Tracking dynamic systems with a continuum of states in an analytical manner becomes difficult when conditional densities of the combined signal 122 are mixtures of many component densities. Unfortunately, this is the case in most real-world systems where speech is subject to both stationary noise, and dynamic or non-stationary noise, e.g., background conversation, music, environmental acoustics, traffic, etc. This analytical intractability is primarily due to two conditions.

First, the complexity of the estimated distribution for the state of the system, as measured by the number of parameters in the system, increases exponentially over time. In addition, when the relationship between the measured output and the true output of the system is non-linear, the estimated state distributions may not have a closed form. Both of these problems are encountered in continuous-state dynamic systems used to estimate time series data.

SUMMARY OF THE INVENTION

The present invention tracks noise in an acoustic signal as a sequence of states of a dynamic system with a continuum of states. The dynamic system according to the invention is represented in a closed form. Acoustic samples generated by the system are assumed to be related to the states by a functional relation. The relationship models speech as a corrupting influence on noise. This is in contrast with the prior art, where the noise is always considered as a corruption of the underlying speech signal.

The complexity of the estimated distribution of the state of the system is reduced by sampling the predicted distribution of the state at time steps, locally discretizing the samples in a dynamic manner and propagating the thus simplified distributions in time. The non-linearity of the relation between the true and measured outputs of the system is tackled by locally linearizing the relationship around each sample of the states.

Thus, by sampling the system iteratively, an estimate of the noise can be obtained, and the noise can then be removed from the signal to provide results that improve upon prior art stationary noise models.

In stark contrast with prior art vector Taylor system (VTS) approaches, the invention assumes that it is the speech signal that corrupts the noise. The measurements of the speech-corrupted noise are non-linearly related to both the hypothetical measurements of the noise that would have been made, had there been no corrupting speech, and the corresponding measurements of the corrupting speech in the absence of noise. Note that this is totally different from the statement that the noise and the corrupting speech are non-linearly combined.

Based on this model, the invention estimates the noise from its "speech-corrupted" measurements. After the noise has been estimated, it can be removed from the input signal, using known methods, to recover the speech signal.

In one embodiment of the invention, the dynamic system is a continuous-state dynamic system, which uses linear Markovian dynamics. These represent a first order fit to any underlying dynamic system, however complex, and capture most of the salient features of the underlying system. Also, first-order parameters are fewer and can be learned robustly from a small amount of training data. In another embodiment, the system can use non-linear dynamics.

This is of immense practical value in most situations encountered in speech recognition, wherein the system must compensate for noise.

BRIEF DESCRIPTION OF THE DRAWINGS

FIG. 5 is a diagram of steps of process for estimating state densities; and

DETAILED DESCRIPTION OF THE PREFERRED EMBODIMENT

Generic Noise Dynamic System

Figure 1:
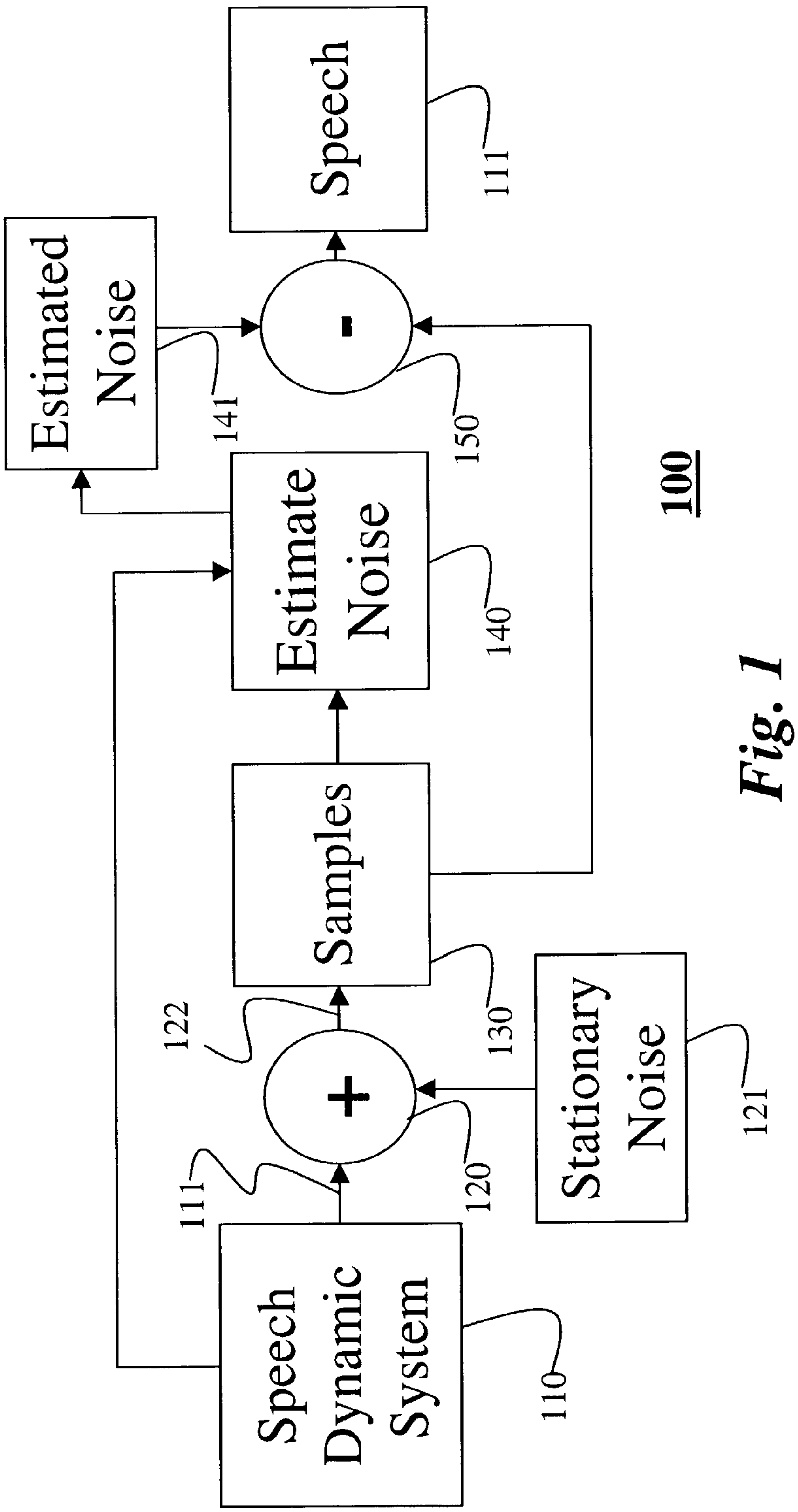
Fig. 1 Prior Art
FIG. 1 is a block diagram of a prior art signal processing system and method.
Figure 2:
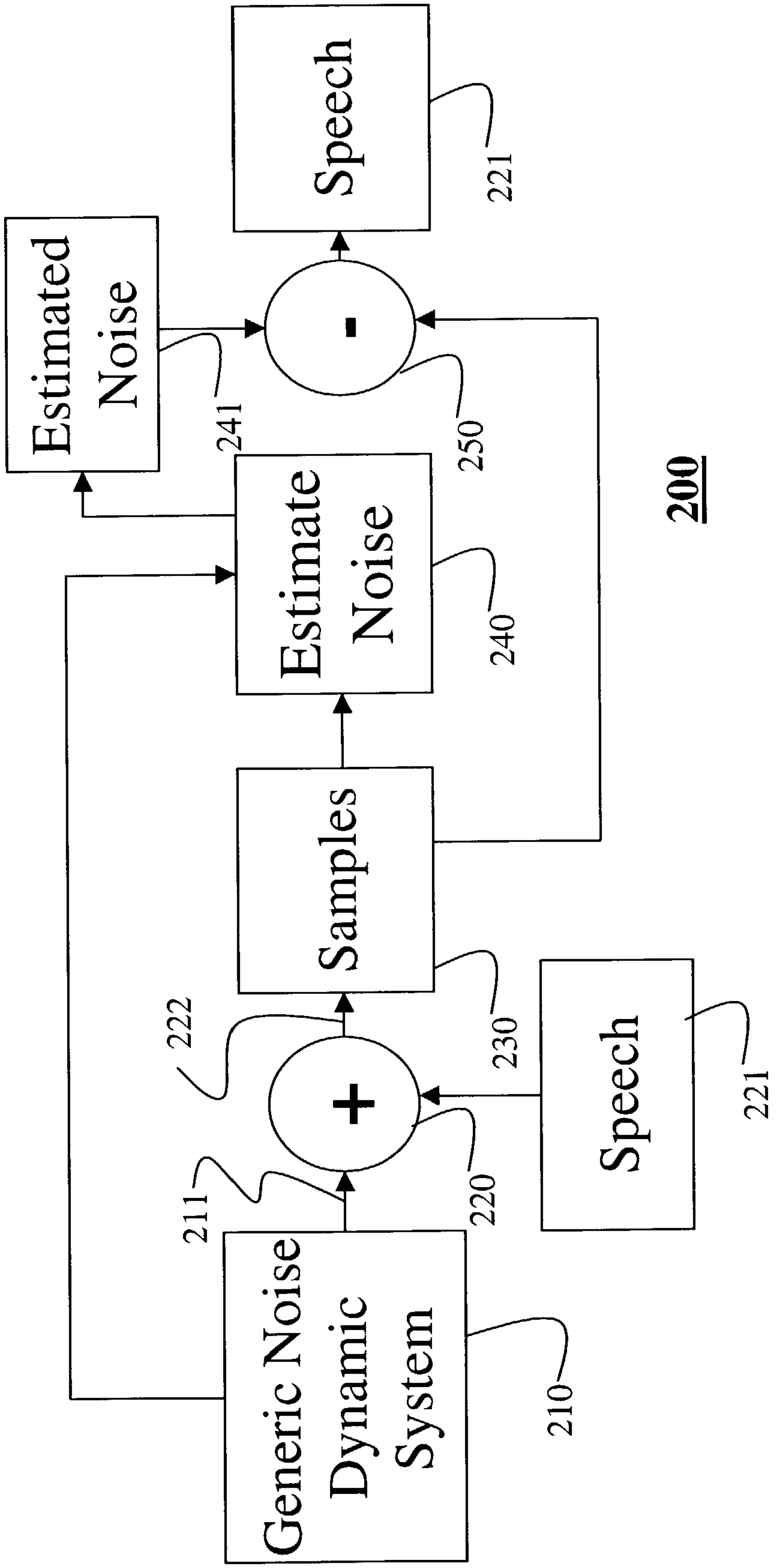
FIG. 2 is a block diagram of a signal processing method according to the invention.

FIG. 2 shows a method and system 200 for canceling noise in a signal according to the invention. The signal processing system 200 according to our invention is modeled as follows. A dynamic system 210 generates a primary signal 211. The primary signal 211 is a dynamic time series, specifically, generic noise. We distinguish generic noise from stationary noise, because generic noise can include non-stationary components, i.e., noise that is not necessarily AWG noise, such as unintelligible background conversation in a bar, on a subway, at a loud party, or on the street.

The primary signal 211 is subject 220 to a corrupting and additive secondary signal 221, specifically, a dynamic signal, such as human speech, to produce a combined signal 222. The problem is to recover the secondary signal 221 from the combined signal 222.

Therefore, according to the invention, the combined signal 222 is measured to obtain samples 230. An estimate 241 of the generic noise 211 is determined 240 based on a understanding or model of the dynamic system 210 that generated the primary signal 211. The estimated noise 241 is then removed from the samples 230, using known methods, to recover the secondary signal 221.

Our invention describes the dynamic system 200 by two equations. A state equation specifies state dynamics 210 of the system, and an observation equation relates an underlying state of the system to the measurements, i.e., samples 230 of the combined signal 222. When the state dynamics of the system are assumed to be Markovian, the state equation can be represented as $$s_t = f(s_{t-1}, e_t) \tag{1}$$

where the state $s_t$ at time t is a function of the state at time t−1, and a driving term $e_t$, e.g., a Gaussian excitation process. The output of the system at any time is usually assumed to be dependent only on the state of the system at that time.

The observation equation can be represented as $$o_t = g(s_t, \gamma_t) \tag{2}$$

where $o_t$ is the observation at time t and $\gamma_t$ represents the noise affecting the system at time t.

In many cases, the best set of state and observation equations required to model the system 200 accurately can be quite complex, making the estimation of the state from the observations 230 intractable. In addition, the estimation of the parameters of the system can be very difficult from a finite amount of data. For these reasons, it is often advantageous to approximate the dynamics with a simple first-order system.

In keeping with this argument, we model the dynamics of the system 210 whose states are log-spectral vectors of noise expressed as $$n_t = An_{t-1} + e_t \tag{3}$$

where $n_t$ represents the noise log-spectral vector at time t, A represents a parameter of an auto-regressive model (AR), and $e_t$ represents the Gaussian excitation process. The AR model is of order one and assumes that the sequence of noise log-spectral vectors can be modeled as the output of a first-order AR system excited by a zero mean Gaussian process. The AR parameter A and the variance $\phi_e$ of $e_t$ can all be learned from a small number of representative noise samples. The mean of $e_t$ is assumed to be zero.

The log-spectral vectors of noisy samples $y_t$ 230 are related to the state of the dynamic system by $n_t$ 210 and the log-spectra of the corrupting speech 221 by $$y_t = f(x_t, n_t) = x_t + \log(1 + \exp(n_t - x_t)) = x_t + l(x_t, n_t) \tag{4}$$

Equations (3) and (4) represent the state and observation equations of the system 210 respectively.

Having thus represented the dynamic system 210, we next need to determine the state of the dynamic system, namely the noise 211, given only the sequence of samples 230, the parameters of the state equation A and ϕhd e, and the distribution of $x_t$.

We model the distribution of $x_t$ by a mixture Gaussian density of the form $$P(x_t) = \sum_{k=1}^{K} c_k N(x_t; \mu_k, \sigma_k) \tag{5}$$

where $c_k$, $\mu_k$ and $\sigma_k$ represent the mixture weight, mean and variance respectively of the Gaussian mixture, and the function N( ) represents the Gaussian.

Noise Estimation

The sequence of observations, e.g. the samples 230 $y_0, \ldots, y_t$ as $y_{0,t}$. The a posteriori probability distribution of the state of the system at time t, given the sequence of observations $y_{0,t}$ 230 is obtained through the following recursion:

$$P(n_t \mid y_{0,t-1}) = \int_{-\infty}^{\infty} P(n_t \mid n_{t-1}) P(n_{t-1} \mid y_{0,t-1}) dn_{t-1} \tag{6}$$

$$P(n_t ? y_{0,t}) = CP(n_t ? y_{0,t-1}) P(y_t ? n_t) \tag{7}$$

where C is a normalizing constant.

Equation 6 is referred to as a prediction equation and equation 7 as an update equation. $P(n_t ? y_{0,t-1}))$ is the predicted distribution for $n_t$ and $P(n_t ? y_{0,})$ is the updated distribution for $n_t$. When the dynamic system is linear, equation 6 is readily solvable. When the dynamic system is non-linear, equation 6 can be solved by first linearizing the first term $(P(n_t ? n_{,t-1}))$ of the integral in equation 6.

The problem is to estimate the updated distribution. We refer to recursions of Equation 6 and Equation 7 as the Kalman recursion.

From Equation 3, because $e_t$ has a Gaussian distribution, the conditional density of $n_t$ given $n_{t-1}$ is $$P(n_t ? n_{t-1}) = N(n_t; An_{t-1}, \phi_e) \tag{8}$$

The speech vector at any time t may have been generated by any of the K Gaussians in the Gaussian mixture distribution in Equation 5, with a probability $c_k$, and therefore $$P(y_t \mid n_t) = \sum_{k=1}^{K} c_k P(y_t \mid n_t, k) \tag{9}$$

where $P(y_t ? n_t, k)$ is the probability of $y_t$, conditioned on $n_t$, and given that the speech vector was generated by the $k^{th}$ Gaussian in the mixture.

It can be shown that $$P(y_t \mid n_t, k) = \frac{N(f^{-1}(y_t, n_t); \mu_k, \sigma_k)}{\left|\frac{d y_t}{d x_t}\right|} \tag{10}$$

where $,^{-1}$ is the inverse function that derives $y_t$ as a function of $x_t$, and $n_t$, and the Jacobian determinant of $y_t$ in the denominator is the determinant of the derivative of $y_t$ with respect to $x_t$.

Both $,^{1}$ and the Jacobian are highly non-linear functions, as a result of which $P(y_t ? n_t, k)$ has a form that leads to complicated solutions. In order to avoid this complication, we approximate Equation 4 by a truncated Taylor series, expanded around the mean of the $k^{th}$ Gaussian:

$$l(x_t, n_t)=l(\mu_k, n_t)+l'(\mu_k, n_t)(x_t-\mu_k)+ \tag{11}$$

Higher order terms are not shown in the Equation 11. We truncate this series after the first term, to obtain $$l(x_t, n_t)\approx l(\mu_k, n_t) \tag{12}$$

which can be used to derive $P(y_t ? n_t, k)$ as $$P(y_t ? n_t, k)=N(y_t;\mu_k+l(\mu_k, n_t), \sigma_k)=N(y_t; ,(\mu_k, n_t), \sigma_k) \tag{13}$$

We could truncate the series expansion in Equation 11 after the first order term, and $P(y_t ? n_t, k)$ would still be Gaussian. However, inclusion of higher order terms in the approximation will result in more complicated distributions for $P(y_t ? n_t, k)$.

It is important to note that the approximation in Equation 12 is specific to the $k^{th}$ Gaussian. Combining Equation 13 with Equation 9, we get the approximation of $P(y_t ? n_t)$ $$P(y_t \mid n_t) = \sum_{k=1}^{K} c_k N(y_t; f(\mu_k, n_t), \sigma_k) \tag{14}$$

The Kalman recursion mentioned above is initialized using the a priori distribution of the noise $$P(n_0 ? y_{0,-1})=P(n_0) \tag{15}$$

Figure 3:
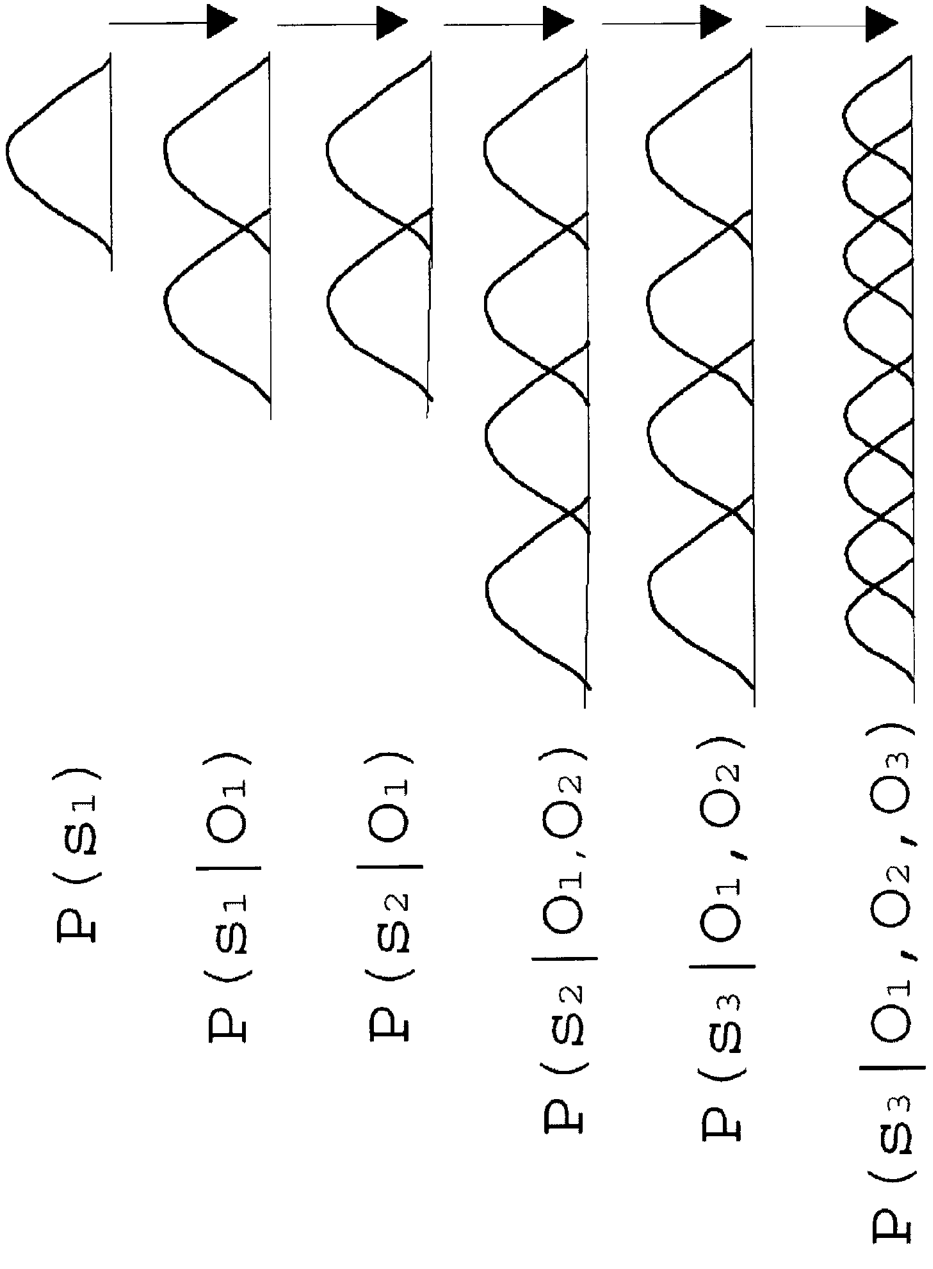
FIG. 3 is a diagram of an evolution of the state distributions of a continuous state dynamic system without sampling.

While it is now possible to now run the Kalman recursion by direct computations of Equations 6 and 7, this results in an exponential increase in the complexity of the updated distribution for the vectors $n_t$ with increasing time t, as shown in FIG. 3. In general, the estimated distribution of the vectors $n_t$ are a mixture of $K^{t+1}$ Gaussians with continuous densities as shown in FIG. 3.

The problem could be simplified by collapsing the Gaussian mixture distribution for $P(y_t ? y_{0,t})$ into a single Gaussian at every step. However this leads to unsatisfactory solutions and poor tracking of the noise.

Sampling the Predicted State Density

Figure 4:
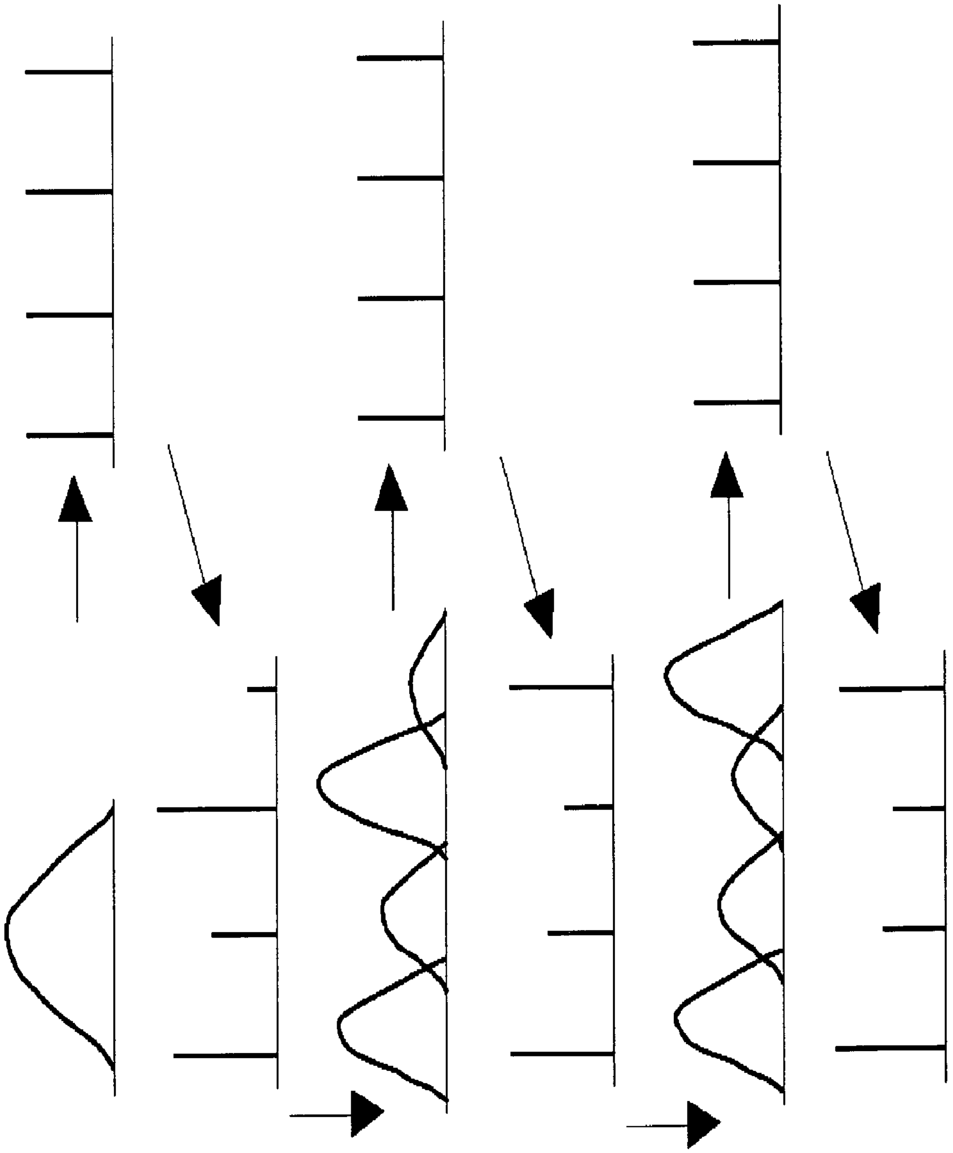
FIG. 4 is a diagram of an evolution of the state distributions of a continuous state dynamic system with sampling according to the invention.

Instead, as shown in FIG. 4, we use sampling methods to reduce the problem. The complexity of the a posteriori noise distribution is reduced by discretizing the predicted noise density at each time step. The predicted noise density is sampled to generate a number of noise samples. The continuous density is then represented by a uniform discrete distribution over these generated samples $$P(n_t \mid y_{0,t-1}) \approx \frac{1}{N}\sum_{k=0}^{N-1} \delta(n_t - n^k) \tag{16}$$

where $n^k$ is the $k^{th}$ noise sample generated from the continuous density, and N is the total number of samples generated from it. Thereafter, the update equation simply becomes $$P(n_t \mid y_{0,t}) = C\sum_{k=0}^{N-1} P(y_t \mid n^k)\delta(n_t - n^k) \tag{17}$$

where C is a normalizing constant that ensures that the total probability sums to 1.0. $P(y_t ? n^k)$ is computed using Equation 14. The prediction equation for time t+1 becomes:

$$P(n_{t+1} \mid y_{0,t}) = C\sum_{k=0}^{N-1} P(y_t \mid n^k)P(n_{t+1} \mid n^k) \tag{18}$$

This is a mixture N of distributions of the form $P(n_{t+1} ? n^k)$. This is once again sampled to approximate it as in Equation 16. The overall process is summarized in the five steps shown in FIG. 5.

Compensating for Noise

The noise estimation 240 process described above estimates, for each frame of incoming combined signal 222, a discrete a posteriori distribution of the form $$P(n_t \mid y_{0,t}) = C\sum_{k=0}^{N-1} P(y_t \mid n^k)\delta(n_t - n^k) \tag{19}$$

For any estimate of the noise, $n^k$, we estimate $x_k$, which is the log spectrum of the speech signal 211, from the log spectrum of the observed noisy speech signal 211, using an approximated minimum mean squared estimation (MMSE) procedures:

$$\hat{x}_t^k = y_t - \sum_{j=1}^{K} p(j \mid y_t, n^k) f(\mu_j, n^k) \tag{20}$$

where p(j?$y_t$, $n^k$) is given by $$p(j \mid y_t, n^k) = \frac{c_j N(y_t; f(\mu_j, n^k), \sigma_j)}{\sum_{i=1}^{K} c_i N(y_t; f(\mu_i, n^k), \sigma_i)} \tag{21}$$

Combining Equations (19) and (20), we get the overall estimate for $x_t$ as $$\hat{x}_t = y_t - C\sum_{k=0}^{N-1} P(y_t \mid n^k) \sum_{j=1}^{K} p(j \mid y_t, n^k) f(\mu_j, n^k) \tag{22}$$

EFFECT OF THE INVENTION

Figure 6:
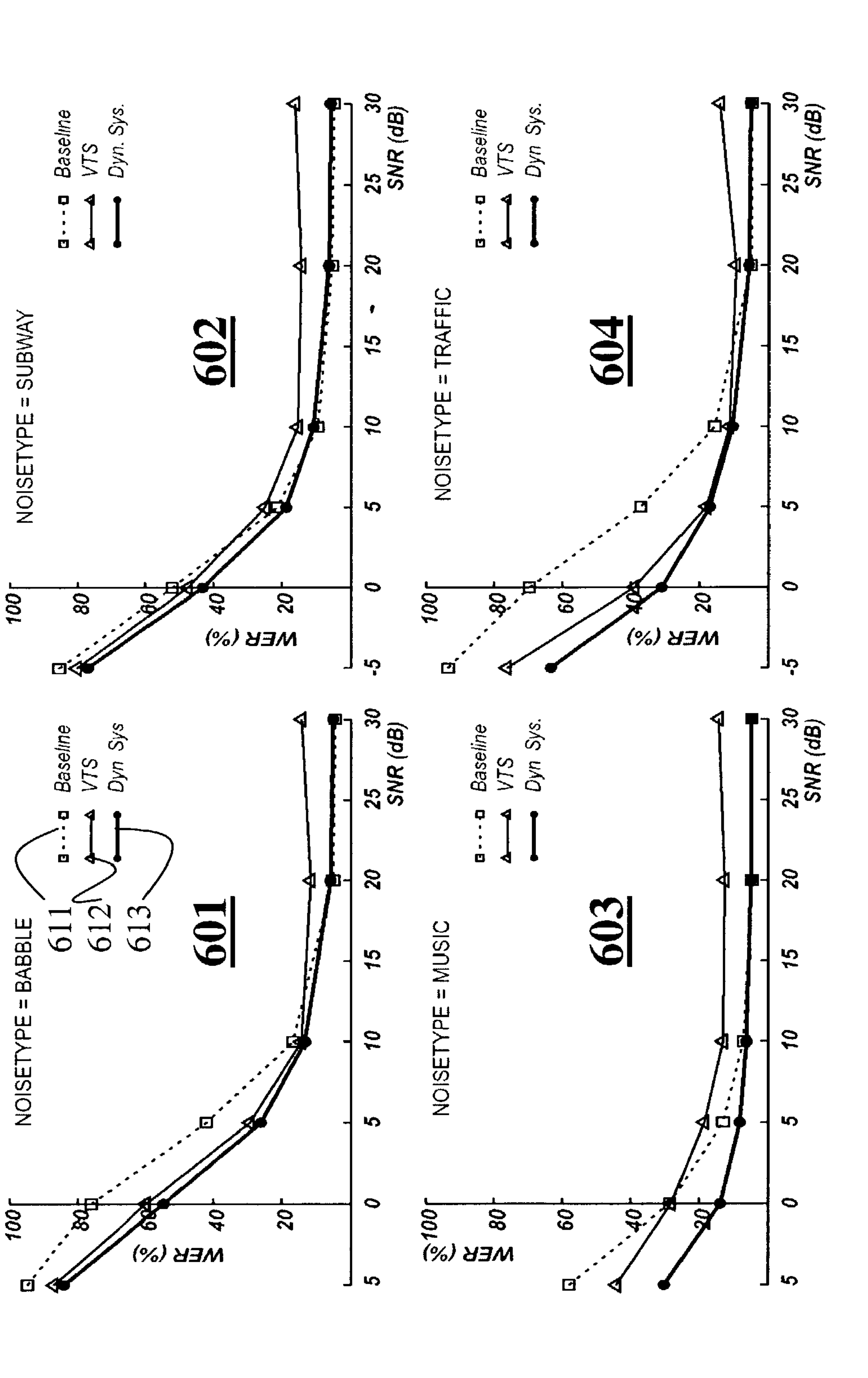
FIG. 6 are graphs compare word error rates at various SNR levels for speech subject to different types of non-stationary noise.

FIG. 6 compares speech recognition test results obtained in the presence of four types of generic noise as a function of SNR and the x-axis. The test data includes Spanish telephone recordings corrupted by background noise including inarticulate and imperfect speech recorded in a bar, i.e., "babble" 601, subway 602, music 603, and traffic 604. Word error rates (WERs) on the y-axis are compared for baseline uncompensated speech 611, the prior art VTS method 612 and the dynamic system according to the invention 613.

It can be seen that all methods are effective at improving recognition performance at low SNRs. At low SNRs, it is advantageous to eliminate even an average (stationary) characteristic of the noise, regardless of the non-stationary nature of the noise.

However, at higher SNRs, the prior art VTS method begins to falter, because the noises are non-stationary. At these SNRs, recognition performance with VTS-compensated speech is actually poorer than that obtained with the base line uncompensated noisy speech.

In contrast the method according to the invention is able to cope with the non-stationarity of the noise at all SNRs, and performs consistently better than the prior art VTS method. Even at SNRs higher than 20 dB, where the speech is essentially "clean," the invented method does not degrade performance to a perceptible degree.

The invention results in more reduction in the level of the noise in the final estimate of the speech signal as compared to the prior-art VTS method. The invention improves the noise level effectively by a factor of between 2 and 3, i.e., up to 5 dB, as compared with the prior art VTS method.

The method and system according to the invention uses more information about the noise signal than prior art models. Those generally assume that the noise is stationary. However, the amount of explicit information required about the noise is small, due to the simple first order model assumed for the dynamics.

Even this small amount of information enables the invention to track the noise well. In the examples used to described the invention, the type of noise corrupting the speech signal was assumed to be known. However, in a more generic case, this may not be known. In such applications, one solution has several different dynamic systems trained on a variety of noise types.

The most appropriate model for the noise type affecting the signal can then be identified using system or model identification methods where the speech log-spectra are modeled as the output of an IID process. They can also be modeled by an HMM, without any significant modification of the process. As an extension to the invention, we can treat the systems generating the speech and the noise as coupled dynamic systems, and the entire process can be appropriately modified to simultaneously track both speech and noise.

The dynamic system modeling the noise can itself also be extended. For example, above, the AR order for the dynamic system is assumed to be one. This can easily be extended to higher orders. Additionally, the dynamic system can be made non-linear without major modifications to invention.

It should also be noted that the invention can operate as a single pass on-line process, as opposed to the prior art off-line processes, such as VTS, that require multiple passes over the noisy data. Furthermore, being on-line, the method can be performed in real-time.

The invention estimates the noise at each instant of time without reference to future data enabling for the compensation of data as they are encountered. Furthermore, it should be understand that the invention can be used for any time series signal subject to noise.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for reducing noise in a time series signal, comprising:

modeling generation of a primary signal by a dynamic system with a continuum of states, the primary signal including generic noise;

adding a secondary signal to the primary signal to form a combined signal, the secondary signal including time series data;

estimating the generic noise in the combined signal using the dynamic system; and removing the estimated generic noise from the combined signal to recover the secondary signal.

2. The method of claim 1 wherein the generic noise includes stationary and non-stationary noise.

3. The method of claim 1 wherein the secondary signal is an acoustic signal.

4. The method of claim 3 wherein the acoustic signal is a speech signal.

5. The method of claim 1 wherein the dynamic system includes a continuum of states.

6. The method of claim 1 further comprising:

sampling the continuum of states at time steps to obtain an estimated distribution of the primary signal.

7. The method of claim 6 further comprising:

locally linearizing a non-linear relationship between the primary signal and the combined signal around each sample of the combined signal.

8. The method of claim 1 wherein the estimating and removing are performed in on-line during a single pass on the combined signal.

9. The method of claim 1 wherein the dynamic system is represented in a closed form.

10. The method of claim 4 wherein the secondary signal is assumed to corrupt the primary generic noise signal.

11. The method of claim 1 wherein the dynamic system uses linear Markovian dynamics.

12. The method of claim 11 further comprising:

learning first-order parameters of the Markovian dynamics from training data.

13. The method of claim 1 wherein the dynamic system is modeled by a state equation $$s_t = f(s_{t-1}, e_t),$$

where a state $s_i$ at a time t is a function of a state at a time t−1, and $e_t$ is a driving term, and the combined signal is modeled by an observation equation $$o_t = g(s_t, \gamma_t),$$

where $o_i$ is a sample at time t, and $\gamma_t$ represents the primary signal at time t.

14. The method of claim 13 wherein log-spectral vectors of the primary signal are expressed as $$n_t = An_{t-1} + e_t,$$

where $n_t$ represents a particular log-spectral vector at time t, A represents a parameter of an auto-regressive model, and $e_t$ represents the Gaussian excitation process.

15. The method of claim 8 further comprising:

performing the estimating is done in real-time.

16. The method of claim 1 wherein the dynamic system uses non-linear Markovian dynamics.

17. A method for reducing noise in a combined signal, the combined signal including time series data and generic noise, comprising:

estimating the generic noise in the combined signal using a dynamic system modeling the generic noise, the dynamic system having a continuum of states; and removing the estimated generic noise from the combined signal to recover the time series data.

18. The method of claim 17 wherein the generic noise includes stationary and non-stationary noise.

19. A system for reducing noise in a time series signal, comprising:

a dynamic system configured to model a generation of a primary signal including generic noise, the dynamic system having a continuum of states;

means for adding a secondary signal to the primary signal to form a combined signal, the secondary signal including time series data;

means for estimating the generic noise in the combined signal using the dynamic system; and means for removing the estimated generic noise from the combined signal to recover the secondary signal.

* * * * *